United States Patent [19]

Iwamida

[11] Patent Number: 5,704,005
[45] Date of Patent: Dec. 30, 1997

[54] SPEECH RECOGNITION APPARATUS AND WORD DICTIONARY THEREFOR

[75] Inventor: Hitoshi Iwamida, Kawasaki, Japan

[73] Assignee: Fujitsu Limited, Kawasaki, Japan

[21] Appl. No.: 377,727

[22] Filed: Jan. 25, 1995

[30] Foreign Application Priority Data

Jan. 28, 1994 [JP] Japan .................. 6-008079

[51] Int. Cl.$^6$ ........................................ G10L 5/06
[52] U.S. Cl. .............. 395/2.63; 395/2.47; 395/2.64; 395/2.66
[58] Field of Search .................. 395/2, 2.15, 2.17, 395/2.4, 2.45, 2.47, 2.6, 2.61, 2.63, 2.64, 2.65, 2.66, 2.48, 2.49, 2.5

[56] References Cited

U.S. PATENT DOCUMENTS

| | | | |
|---|---|---|---|
| 4,741,036 | 4/1988 | Bahl et al. | 381/43 |
| 5,280,563 | 1/1994 | Ganong | 395/2 |
| 5,440,662 | 8/1995 | Sukkar | 395/2.45 |
| 5,555,344 | 9/1996 | Zünkler | 395/2.51 |
| 5,621,849 | 4/1997 | Sakurai et al. | 395/2.5 |

FOREIGN PATENT DOCUMENTS

| | | |
|---|---|---|
| 3-278097 | 12/1991 | Japan . |
| 4-198998 | 7/1992 | Japan . |

OTHER PUBLICATIONS

"Speech Recognition Using Weighted HMM and Subspace Projection Approaches", Keh-Yih Su et al., IEEE Transactions or Speech and Audio Processing, pp. 69-79 vol. 2, No. 1, Part I, Jan. 1994.

*Primary Examiner*—Krista M. Zele
*Assistant Examiner*—Scott L. Weaver
*Attorney, Agent, or Firm*—Staas & Halsey

[57] ABSTRACT

A speech recognition apparatus is provided with a word dictionary managing subword sequences of words that have possibility of being input together with information indicating importance of each of subwords in each subword sequence which forms a word, where the importance indicates whether or not the subwords of the word are an important factor when recognizing the word, a managing part for managing standard values of acoustic feature patterns of each of the subwords, a generating part for successively reading the words stored in the word dictionary and for generating acoustic feature patterns of each of read subwords using the standard values managed by the managing part, and a collating part for calculating and evaluating distances between an acoustic feature pattern of an input word that is to be recognized and each of the acoustic feature patterns generated by the generating part by referring to the information.

19 Claims, 6 Drawing Sheets

| WORD NO. | SUBWORD SEQUENCE IMPORTANCE VALUE | | | |
|---|---|---|---|---|
| 001 | "A" 1.2 | "I" 1.2 | "CHI" 0.8 | |
| 002 | "A" 0.8 | "I" 1.2 | "TSU" 1.2 | |
| 003 | "A" 0.8 | "O" 1.2 | "MO" 1.2 | "RI" 0.8 |
| ⋮ | ⋮ | | | |

FIG.4

| SUBWORD NAME | FEATURE PATTERN |
|---|---|
| "A" | $(a_1 \sim a_m)$ |
| "I" | $(b_1 \sim b_n)$ |
| ⋮ | ⋮ |

| WORD NO. | SUBWORD SEQUENCE<br>IMPORTANCE VALUE | |
|---|---|---|
| 0 0 1 | [m]　[i]　[s]　[t]　[er]<br>1.2　1.2　1.2　0.8　0.8 | MISTER |
| 0 0 2 | [m]　[i]　[s]　[t]　[ei]　[k]<br>0.8　0.8　0.8　1.2　1.2　1.2 | MISTAKE |
|  |  | |
| ⋮ | ⋮ | |

FIG. 7

SPEECH RECOGNITION APPARATUS AND WORD DICTIONARY THEREFOR

BACKGROUND OF THE INVENTION

The present invention generally relates to speech recognition apparatuses and word dictionaries, and more particularly to a speech recognition apparatus that recognizes words indicated by speech signals and to a word dictionary for use on such a speech recognition apparatus.

Speech recognition apparatuses that recognize words indicated by speech signals are put into various use. In order to realize practical speech recognition apparatuses, it is necessary to realize a high recognition rate.

According to the conventional speech recognition apparatuses that recognize the words of the speech, syllables or phonemes are regarded as recognition units (hereinafter referred to as subwords). A word dictionary or lexicon is provided in the speech recognition apparatus to manage subword sequences of words which have the possibility of being input. The word dictionary manages standard values of acoustic feature patterns of each of the subwords.

When the word to be recognized is input to the speech recognition apparatus, the words are successively read from the word dictionary, and the standard acoustic feature patterns of each of the subwords forming the read word are connected to generate the acoustic feature pattern of the word that is registered in the word dictionary. A distance between the acoustic feature pattern of the input word and each generated acoustic feature pattern of the registered word is calculated. The registered word with a minimum distance from the input word is regarded as having a highest similarity to the input word, and this registered word is output as a recognition result.

However, according to the conventional speech recognition apparatus, the recognition process is carried out by taking no consideration as to the peculiar feature of each word. As a result, there was a problem in that a high recognition rate cannot be obtained.

In other words, each word has a feature peculiar thereto, such as a weak pronunciation of a syllable at the ending of the word and an accent of a syllable at the beginning of the word. But because the conventional speech recognition apparatus carries out the recognition process without taking any consideration of such features peculiar to the words, there was a problem in that a high recognition rate cannot be obtained.

SUMMARY OF THE INVENTION

Accordingly, it is a general object of the present invention to provide a novel and useful speech recognition apparatus and a word dictionary therefor, in which the problem described above is eliminated.

Another and more specific object of the present invention is to provide a speech recognition apparatus comprising a word dictionary managing subword sequences of words that have a possibility of being input together with information indicating importance of each of the subwords in each subword sequence which forms a word, where the importance indicates whether or not the subwords of the word are an important factor when recognizing the word, managing means for managing standard values of acoustic feature patterns of each of the subwords, generating means, coupled to the word dictionary and the managing means, for successively reading the words stored in the word dictionary and for generating acoustic feature patterns of each of read subwords using the standard values managed by the managing means, and collating means coupled to the word dictionary and the generating means, for calculating and evaluating distances between an acoustic feature pattern of an input word that is to be recognized and each of the acoustic feature patterns generated by the generating means by referring to the information. According to the speech recognition apparatus of the present invention, it is possible to obtain a high word recognition rate compared to the conventional speech recognition apparatuses, because the word recognition process puts weight on whether or not the important subwords match.

Still another object of the present invention is to provide a word dictionary adapted for use on a speech recognition apparatus which recognizes an input word by collating an acoustic feature pattern of the input word with acoustic feature patterns of words stored in the word dictionary, comprising, a recording medium, subword sequences of words that have a possibility of being input to the speech recognition apparatus, stored in the recording medium, and information indicating importance of each subword in each subword sequence which forms a word, stored in the recording medium together with the subword sequences, where the importance indicates whether or not the subwords of the word are an important factor when recognizing the word on the speech recognition apparatus. According to the word dictionary of the present invention, it is possible to realize a high word recognition rate on the speech recognition apparatus using the word dictionary.

Other objects and further features of the present invention will be apparent from the following detailed description when read in conjunction with the accompanying drawings.

DESCRIPTION OF THE PREFERRED EMBODIMENTS

First, a description will be given of the operating principle of the present invention, by referring to FIG. 1.

Figure 1:
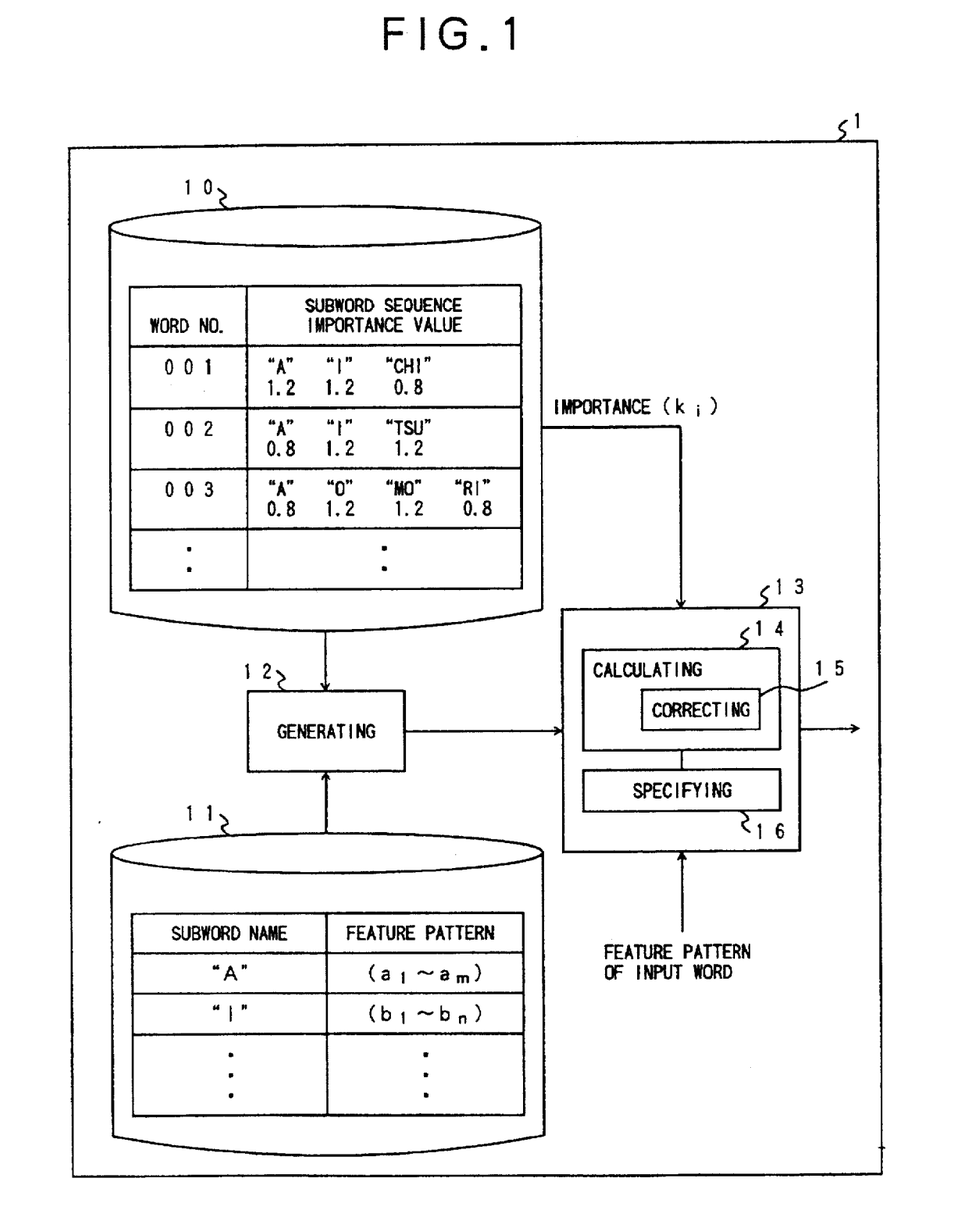
FIG. 1 is a system block diagram for explaining the operating principle of the present invention.

A speech recognition apparatus 1 shown in FIG. 1 includes a word dictionary or lexicon 10, a management part 11, a generating part 12 and a collating part 13.

The word dictionary manages subword sequences of words which have the possibility of being input, together with information indicating the importance of the subwords. The importance indicates whether or not the subwords forming a word are an important factor when recognizing the word. The management part 11 manages standard values of acoustic feature patterns of each of the subwords. The generating part 12 generates standard values of acoustic feature patterns of the words stored in the word dictionary 10.

The collating part 13 is provided with a calculating part 14, a correcting part 15 and a specifying part 16. When given the acoustic feature pattern of an input word that is to be recognized, the collating part 13 calculates the distance between this acoustic feature pattern and each feature pattern generated by the generating part 12, and carries out the word recognition process by evaluating the calculated distances based on the processes carried out by the calculating part 14, the correcting part 15 and the specifying part 16.

In the present invention, the word dictionary 10 manages the subword sequences of each word which has the possibility of being input, while adding information indicating the importance of subwords. For example, the information that is added may be information indicating the subword with an accent as being important and the subword with no accent as not being important or, information indicating the subword that is unlikely to become unvoiced as being important and the subword that is likely to become unvoiced as not important. Such information may be numerical information which indicates the importance or non-importance in two or more levels.

When the word dictionary 10 manages the word information, and the acoustic feature pattern of the input word that is to be recognized is given, the generating part 12 successively reads the words stored in the word dictionary 10 and uses management data of the management part 11 to generate the standard acoustic feature pattern of each read word. Hence, the generating part 12 generates the standard values of the acoustic feature patterns of the words stored in the word dictionary 10.

On the other hand, the calculating part 14 of the collating part 13 calculates the distance between the acoustic feature pattern of the input word that is to be recognized and each of the feature patterns generated by the generating part 12. When making this calculation, the calculating part 14 starts the correcting part 15 and uses the information indicating the importance of the subword, so as to calculate the distance between two feature patterns while correcting the distance between the subwords which form constituent elements of the distance between the two feature patterns so that the distance between the more important subwords become larger.

Responsive to the calculation process of the calculating part 14, the specifying part 16 of the collating part 13 specifies the feature pattern that is the smallest distance from the feature pattern of the input word out of the feature patterns generated by the generating part 12. In other words, the specifying part 16 specifies the feature pattern which is most similar to the feature pattern of the input word that is to be recognized. In addition, the specifying part 16 outputs as the recognition result the word that is registered in the word dictionary 10 and corresponds to the specified feature pattern.

Therefore, according to the present invention, the word recognition process is carried out by putting weight on whether or not the subwords having the high importance match. For this reason, it is possible to recognize the input word with a higher recognition rate when compared to the conventional speech recognition apparatuses.

In FIG. 1, word numbers 001, 002, 003, . . . are registered in the word dictionary 10. With respect to the subword sequence of the word number 001, the importance value indicative of the importance of the subword is 1.2 for the subword "A", 1.2 for the subword "I" and 0.8 for the subword "CHI", where the subword sequence (or word) "AICHI" is the name of a prefecture in Japan. With respect to the subword sequence of the word number 002, the importance value indicative of the importance of the subword is 0.8 for the subword "A", 1.2 for the subword "I" and 1.2 for the subword "TSU", where the subword sequence (or word) "AITSU" is the Japanese for "HIM (or HER)" In addition, with respect to the subword sequence of the word number 003, the importance value indicative of the importance of the subword is 0.8 for the subword "A", 1.2 for the subword "O", 1.2 for the subword "MO" and 0.8 for the subword "RI", where the subword sequence (or word) "AOMORI" is the name of a prefecture in Japan.

Furthermore, in FIG. 1, the management part 11 manages feature patterns (a1, . . . , am) for the subword "A", feature patterns (b1, . . . , bn) for the subword "I", and the like.

Figure 2:
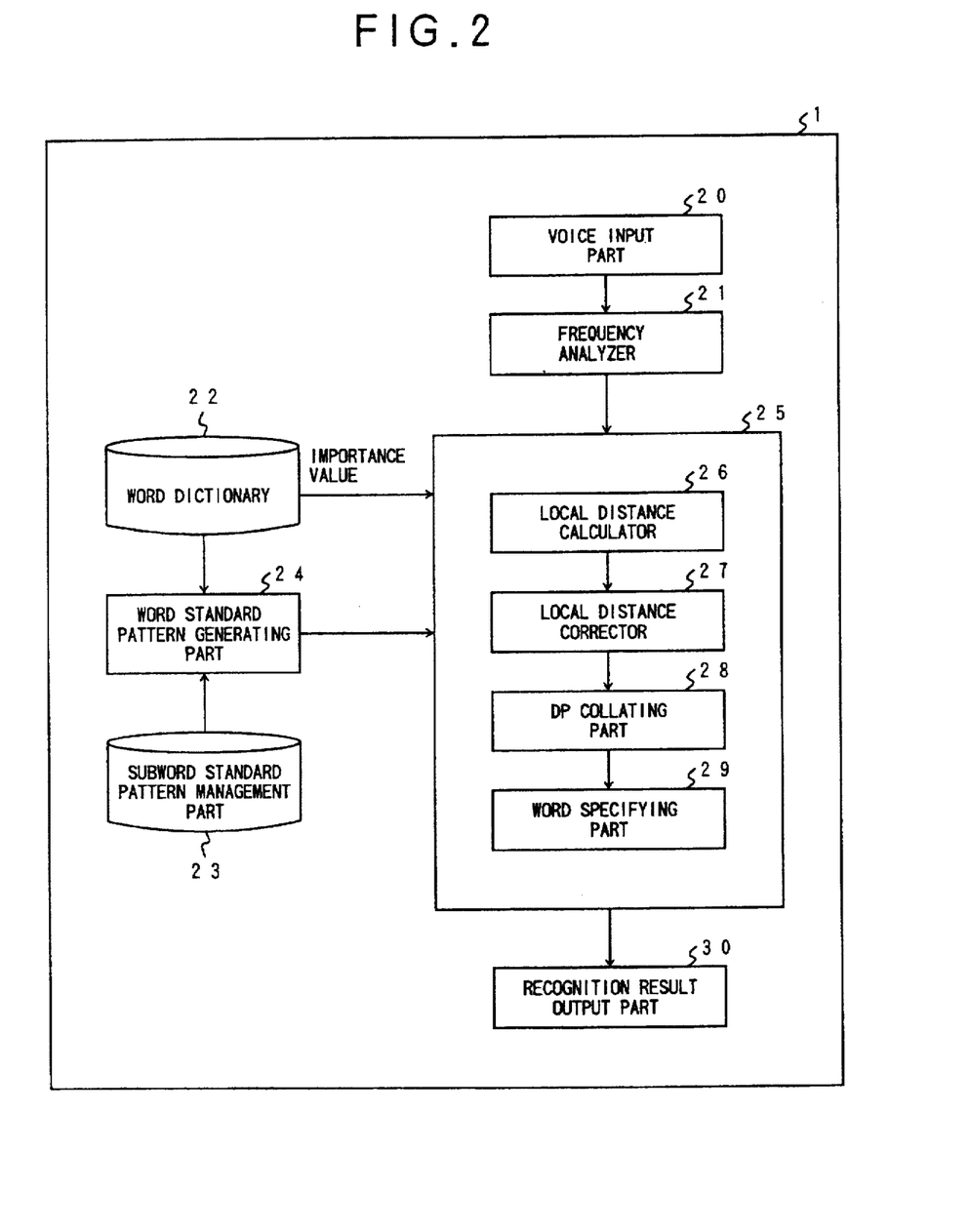
FIG. 2 is a system block diagram showing an embodiment of a speech recognition apparatus according to the present invention.

Next, a description will be given of an embodiment of the speech recognition apparatus according to the present invention. This embodiment of the speech recognition apparatus uses an embodiment of a word dictionary according to the present invention. FIG. 2 shows this embodiment of the speech recognition apparatus.

A speech recognition apparatus 1 shown in FIG. 2 includes a voice input part 20, a frequency analyzer 21, a word dictionary or lexicon 22 with importance, a subword standard pattern management part 23, a word standard pattern generator 24, a weighted collating part 25, and a recognition result output part 30 which are connected as shown. The word dictionary 22 forms the embodiment of the word dictionary according to the present invention. The word dictionary 22 may take the form of a recording medium such as a magnetic disk, an optical disk and a magneto-optic disk, a read only memory device, a storage unit such as a disk unit, and any other memory unit that can satisfy the access speed required by the speech recognition apparatus 1.

The word dictionary 22 corresponds to the word dictionary 10 shown in FIG. 1, the subword standard pattern management part 23 corresponds to the management part 11 shown in FIG. 1, the word standard pattern generator 24 corresponds to the generating part 12 shown in FIG. 1, and the weighted collating part 25 corresponds to the collating part 13 shown in FIG. 1.

The voice input part 20 inputs an input word that is spoken by a user. The frequency analyzer 21 carries out a frequency analysis such as a Fast Fourier Transform (FFT) with respect to the input voice for every predetermined period, and obtains the feature pattern which is a time-sequential data of a frequency power indicated by the input word. For example, the frequency analyzer 21 obtains the power value of 16 frequency bands for every 20 ms, so as to obtain the acoustic feature pattern of the input word.

Figure 3:
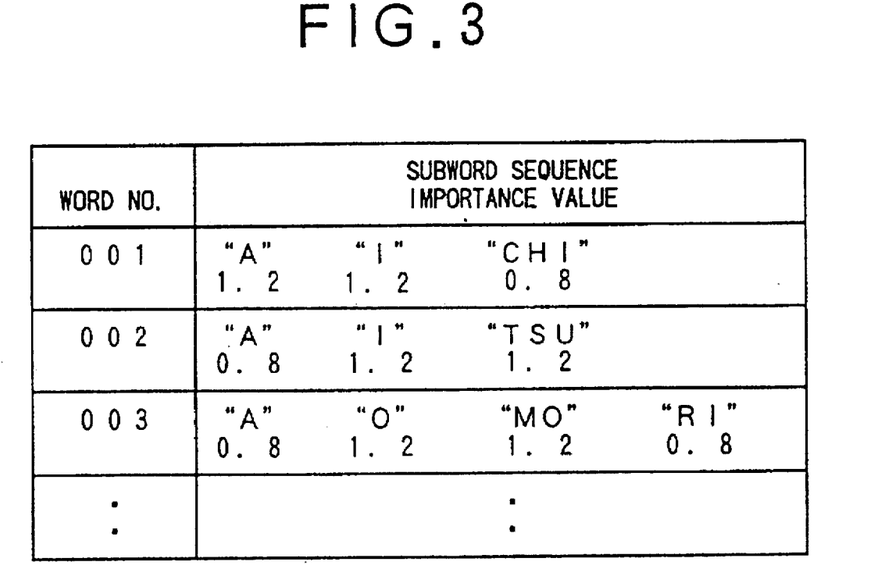
FIG. 3 is a diagram showing an embodiment of management data of a word dictionary with importance.

The word dictionary 22 manages a subword sequence of each word that has the possibility of being input, and an importance value which indicates the importance of each subword. For example, the importance value that is managed in the word dictionary 22 is assigned to each subword depending on whether or not an accent exists. In the case of a Japanese word "AICHI", for example, the portion "AI" is pronounced relatively clearly, while the portion "CHI" tends to be pronounced vaguely. Hence, as shown in FIG. 3 for the word number 001, the importance value 1.2 is assigned to each of the subwords "A" and "I", while the importance value 0.8 is assigned to the subword "CHI" In other words, larger importance values are assigned to those subwords which have an accent in this case. In general, larger importance values are assigned to those subwords which are more important.

It is not essential for the word dictionary 22 to manage the importance values directly. In other words, the word dictionary 22 may simply manage information indicating whether or not each subword is important. In this case, specific importance values corresponding to the information related to each of the subwords may be managed independently of the word dictionary 22.

Figure 4:
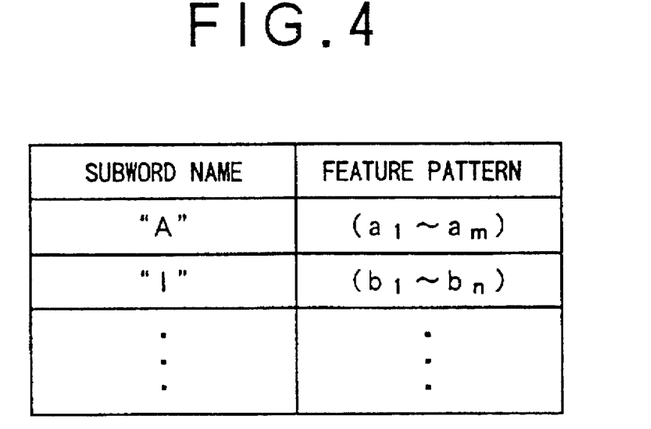
FIG. 4 is a diagram showing an embodiment of management data in a subword standard pattern management part.

The subword standard pattern management part 23 manages standard values of acoustic feature patterns of each of the subwords that are obtained by means similar to the frequency analyzer 21. For example, subword standard pattern management part 23 manages standard values a1, . . ., am of the feature patterns for the subword "A", standard values b1 through bn of the feature patterns for the subword "T", and the like as shown in FIG. 4.

The word standard pattern generator 24 successively reads the words stored in the word dictionary 22 when the frequency analyzer 21 obtains the feature pattern of the input word, and generates the standard acoustic feature patterns of the read words using the management data of the subword standard pattern management part 23. In other words, the word standard pattern generator 24 generates the standard values of the acoustic feature patterns of the words stored in the word dictionary 22. For example, when reading the word "AICHI" from the word dictionary 22, the standard acoustic feature patterns of the subwords "A", "I" and "CHI" are read from the subword standard pattern management part 23, and these standard acoustic feature patterns are connected to generate the standard value of the acoustic feature pattern of the word "AICHI".

The weighted collating part 25 calculates the distance between the feature pattern of the input word obtained by the frequency analyzer 21 and each feature pattern that is generated by the word standard pattern generator 24, according to the dynamic programming (DP) technique, while taking into consideration the importance of the subwords. The weighted collating part 25 carries out the word recognition process by evaluating the calculated distances.

The weighted collating part 25 includes a local distance calculator 26, a local distance corrector 27, a DP collating part 28 and a word specifying part 29 for carrying out the above word recognition process.

The recognition result output part 30 outputs to the outside word information related to the word that is recognized by the weighted collating part Next, a more detailed description will be given of the word recognition process carried out by the weighted collating part 25.

When the frequency analyzer 21 obtains the feature pattern (hereinafter also referred to as an input pattern) of the input word, the local distance calculator 26 of the weighted collating part 25 calculates a local distance between this input pattern and each feature pattern (hereinafter also referred to as a word standard pattern) generated by the word standard pattern generator 24, at each time position.

When the local distance calculator 26 calculates the local distances, the local distance corrector 27 corrects each distance portion of the calculated local distances by multiplying a corresponding importance value obtained from the word dictionary 22. For example, with respect to the distance portion for the subword having the importance value 1.2 that is obtained from the word dictionary 22, the calculated value from the local distance calculator 26 is multiplied by 1.2 in the local distance corrector 27. Similarly, with respect to the distance portion for the subword having the importance value 0.8 that is obtained from the word dictionary 22, the calculated value from the local distance calculator 26 is multiplied by 0.8 in the local distance corrector 27.

Figure 5:
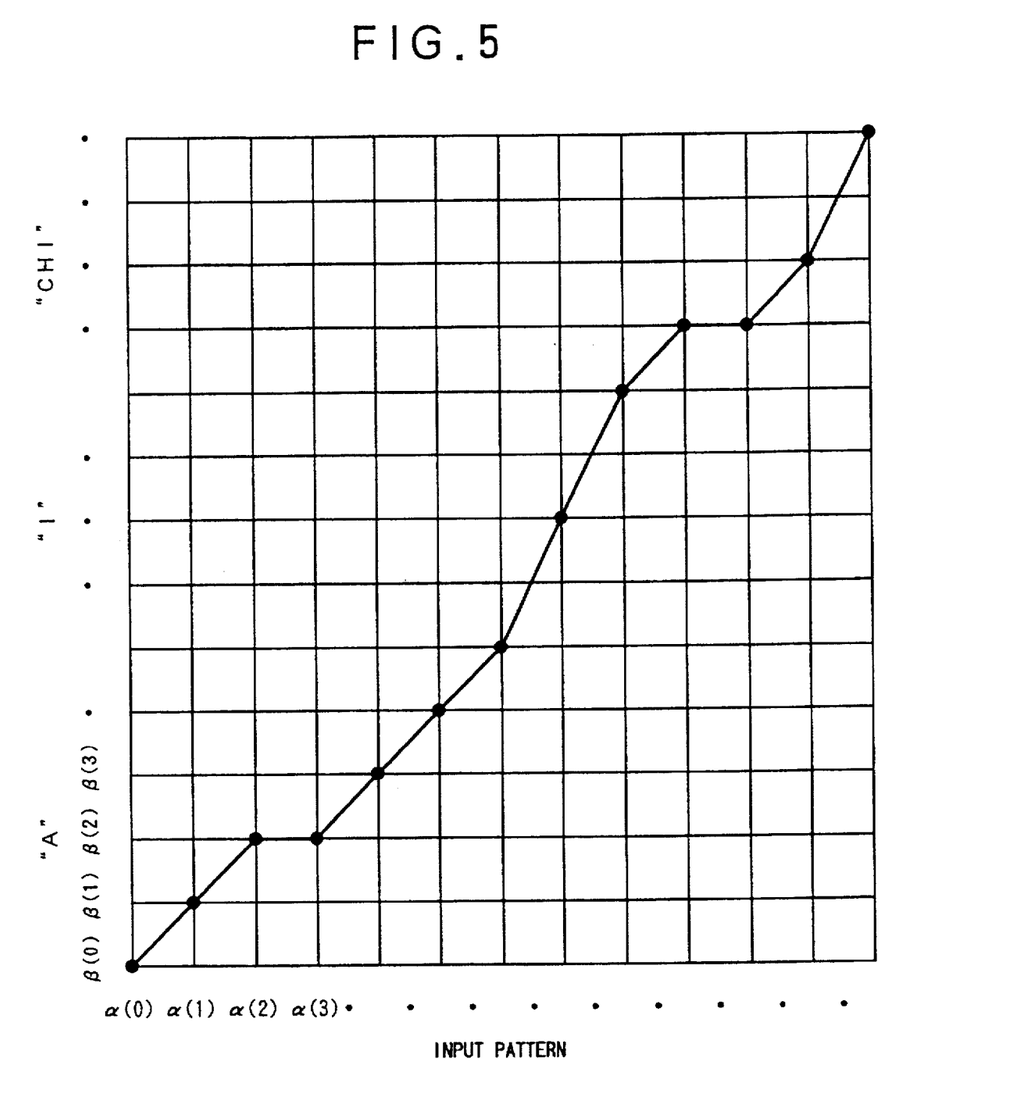
FIG. 5 is a diagram for explaining a dynamic programming path.

Therefore, the corrected local distance between the input pattern and each word standard pattern is calculated at each time position by the processes of the local distance calculator 26 and the local distance corrector 27. When the corrected local distances are calculated, the DP collating part 28 carries out a DP collating process with respect to the input pattern and each word standard pattern according to the DP technique so as to obtain a DP path shown in FIG. 5 and to obtain a distance between each of the two collated patterns. In other words, the time correspondence is obtained between the input pattern and each word standard pattern according to the DP technique, so as to obtain the DP path having a minimum sum total of the corrected local distances out of the paths from a bottom left lattice point (pattern start point) shown in FIG. 5 to a top right lattice point (pattern end point). The sum total of the corrected local distances is obtained from the DP path that is obtained.

When the distances on the DP path are obtained for each of the word standard patterns generated by the word standard pattern generator 24, the word specifying part 29 specifies the distance with the minimum value out of the distances. The word name that corresponds to the specified distance is output to the recognition result output part 30. The recognition result output part 30 outputs to the outside the word name specified by the word specifying part 29 as the recognition result.

Conventionally, the DP path is obtained by calculating a distance L between the input patterns ($\alpha 1$, $\alpha 2$, . . . ) and the word standard patterns ($\beta 11$, $\beta 12$, . . . , $\beta 21$, $\beta 22$, . . . , $\beta 31$, $\beta 32$, . . . ) according to the following formula, when an Euclidian distance between a vector x and a vector y is denoted by $d(x, y)$. In the following formula, a is an integer greater than 2 and h is an integer greater than a.

$$L=d(\alpha 1, \beta 11)+d(\alpha 2, \beta 2)+\ldots+d(\alpha a, \beta 21)+\ldots+d(\alpha b, \beta 31)+\ldots$$

However, the weighted collating part 25 of this embodiment obtains the DP path according to the following formula while correcting the distance for the important subword to a large value and correcting the distance for the non-important subword to a small value, where ki indicates the importance value of each subword corresponding to the word standard patterns ($\beta 11$, $\beta 12$, . . . , $\beta 21$, $\beta 22$, . . . , $\beta 31$, $\beta 32$, . . . ).

$$L=k1d(\alpha 1, \beta 11)+k1d(\alpha 2, \beta 12)+\ldots+k2d(\alpha a, \beta 21)+\ldots+k3d(\alpha b, \beta 31)+\ldots$$

Therefore, this embodiment can obtain a high recognition rate compared to the conventional speech recognition apparatus.

For example, suppose that the user pronounced "AICHI" but the portion "CHI" was not pronounced clearly. In this case, because the portion "CHI" of the input word "AICHI" is not pronounced clearly, the distances of the subwords "A", "I" and "CHI" forming the input word "AICHI" from the word "AICHI" registered in the dictionary become (10, 10, 60) thereby making the sum total of the distances 80, and the distances of the subwords "A", "I" and "CHI" forming the input word "AICHI" from the word "AITSU" registered in the dictionary become (10, 10, 50) thereby making the sum total of the distances 70. In other words, since the portion "AI" of the input word "AICHI" is pronounced clearly, the distances of the subwords "A" and "I" from the corresponding portions of the registered word "AICHI" are small. But on the other hand, because the portion "CHI" of the input word "AICHI" is not pronounced clearly, the distance of the subword "CHI" from the corresponding portion of the registered word "AICHI" becomes large. As a result, according to the conventional speech recognition apparatus, the input word "AICHI" is erroneously recognized as the word "AITSU" although the correct recognition result should be the word "AICHI".

On the other hand, according to this embodiment, the subwords "A" and "I" of the word "AICHI" are registered in the dictionary as important subwords, and the subword "CHI" of the word "AICHI" is registered in the dictionary as a non-important subword, for example. In addition, the subword "A" of the word "AITSU" is registered in the dictionary as a non-important subword, and the subwords "I" and "TSU" of the word "AITSU" are registered in the dictionary as important subwords, for example. In this case, the distance for the important subword is multiplied by 1.2, while the distance for the non-important subword is multiplied by 0.8. As a result, the distances of the subwords forming the input word "AICHI" from the registered word "AICHI" in the conventional case are (10, 10, 60) when the portion "CHI" of the input word "AICHI" is not pronounced clearly, but the distances are corrected to (12, 12, 48) and the sum total of the corrected distances becomes 72 according to this embodiment. Similarly, the distances of the subwords forming the input word "AICHI" from the registered word "AITSU" in the conventional case are (10, 10, 50) when the portion "CHI" of the input word "AICHI" is not pronounced clearly, but the distances are corrected to (8, 12, 60) and the sum total of the corrected distances becomes 80 according to this embodiment. Therefore, this embodiment can correctly recognize the input word "AICHI" as being the word "AICHI" even though the portion "CHI" of the input word "AICHI" is not pronounced clearly. For this reason, the recognition rate is greatly improved according to this embodiment.

The application of the speech recognition is of course not limited to Japanese.

Figure 6:
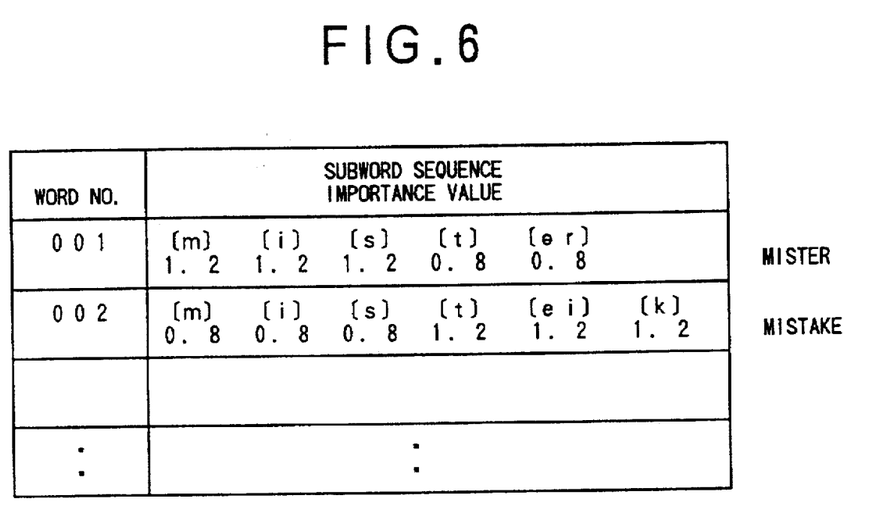
FIG. 6 is a diagram showing another embodiment of management data of the word dictionary with importance.

FIG. 6 is a diagram showing another embodiment of management data of the word dictionary 22.

The word dictionary 22 manages a subword sequence of each word that has the possibility of being input, and an importance value which indicates the importance of each subword. For example, the importance value that is managed in the word dictionary 22 is assigned to each subword depending on whether or not an accent exists. In the case of an English word "MISTER", for example, the portion "MIS" is pronounced relatively clearly, while the portion "TER" tends to be pronounced vaguely. Hence, as shown in FIG. 6 for the word number 001, the importance value 1.2 is assigned to each of the subwords [m], [i] and [s], while the importance value 0.8 is assigned to the subwords [t] and [ər]. In this case, the subwords are indicated by phonetic symbols. In other words, larger importance values are assigned to those subwords which have an accent in this case. In general, larger importance values are assigned to those subwords which are more important.

Similarly, in the case of an English word "MISTAKE", for example, the portion "MIS" is pronounced vaguely, while the portion "TAKE" tends to be pronounced relatively clearly. Hence, as shown in FIG. 6 for the word number 002, the importance value 0.8 is assigned to each of the subwords [m], [i] and [s], while the importance value 1.2 is assigned to the subwords [t], [ei] and [k].

For example, suppose that the user pronounced "MISTER" but the portion "TER" was not pronounced clearly. In this case, because the portion "TER" of the input word "MISTER" is not pronounced clearly, the distances of the subwords [m], [i], [s], [t] and [ər] forming the input word "MISTER" from the word "MISTER" registered in the dictionary become (10, 10, 10, 50, 50) thereby making the sum total of the distances 130, and the distances of the subwords [m], [i], [s], [t] and [ər] forming the input word "MISTER" from the word "MISTAKE" registered in the dictionary become (10, 10, 10, 50, 20, 20) thereby making the sum total of the distances 120. In other words, since the portion "MIS" of the input word "MISTER" is pronounced clearly, the distances of the subwords [m], [i] and [s] from the corresponding portions of the registered word "MISTER" are small. But on the other hand, because the portion "TER" of the input word "MISTER" is not pronounced clearly, the distances of the subwords [t] and [ər] from the corresponding portions of the registered word "MISTER" become large. As a result, according to the conventional speech recognition apparatus, the input word "MISTER" is erroneously recognized as the word "MISTAKE" although the correct recognition result should be the word "MISTER".

On the other hand, according to this embodiment, the subwords [m], [i] and [s] of the word "MISTER" are registered in the dictionary as important subwords, and the subwords [t] and [ər] of the word "MISTER" are registered in the dictionary as a non-important subwords, for example. In addition, the subwords [m], [i] and [s] of the word "MISTAKE" are registered in the dictionary as non-important subwords, and the subwords [t], [ei] and [k] of the word "MISTAKE" are registered in the dictionary as important subwords, for example. In this case, the distance for the important subword is multiplied by 1.2, while the distance for the non-important subword is multiplied by 0.8. As a result, the distances of the subwords forming the input word "MISTER" from the registered word "MISTER" in the conventional case is (10, 10, 10, 50, 50) when the portion "TER" of the input word "MISTER" is not pronounced clearly, but the distances are corrected to (12, 12, 12, 40, 40) and the sum total of the corrected distances becomes 116 according to this embodiment. Similarly, the distances of the subwords forming the input word "MISTER" from the registered word "MISTAKE" in the conventional case is (10, 10, 10, 50, 20, 20) when the portion "TER" of the input word "MISTER" is not pronounced clearly, but the distances are corrected to (8, 8, 8, 60, 24, 24) and the sum total of the corrected distances becomes 132 according to this embodiment. Therefore, this embodiment can correctly recognize the input word "MISTER" as being the word "MISTER" even though the portion "TER" of the input word "MISTER" is not pronounced clearly. For this reason, the recognition rate is greatly improved according to this embodiment.

Of course, the subwords which form the word may be syllables instead of the phonetic symbols.

Figure 7:
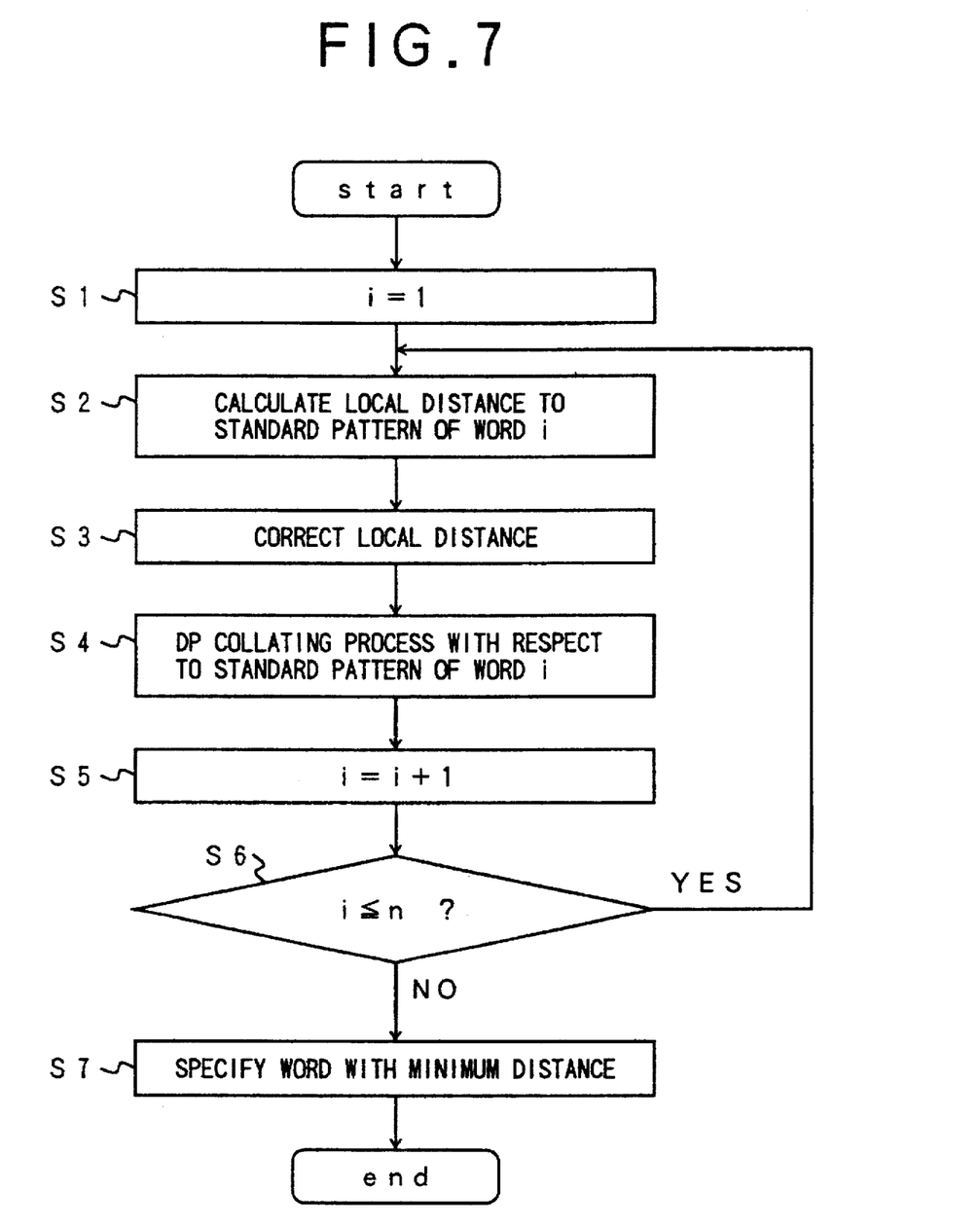
FIG. 7 is a flow chart for explaining the operation of a weighted collating part.

FIG. 7 is a flow chart for explaining the operation of the weighted collating part 25 shown in FIG. 2. In FIG. 7, it is assumed that the operations of the weighted collating part 25 are carried out by software.

In FIG. 7, a step S1 sets i to i=1, and a step S2 calculates the local distance between the input pattern of the input word and the standard pattern of a word i. A step S3 corrects the calculated local distance. A step S4 makes the DP collating process with respect to input pattern and the standard pattern of the word i, and a step S5 increments i such that i=i+1.

Then, a step S6 decides whether or not $i \leq n$, where n denotes the number of words registered in the word dictionary 22. The process returns to the step S2 if the decision result in the step S6 is YES. But if the decision result in the step S6 is NO, a step S7 specifies the word with the minimum distance, and the process ends.

Hence, the step S2 corresponds to the operation of the local distance calculator 26, the step S3 corresponds to the operation of the local distance corrector 27, the step S4 corresponds to the operation of the DP collating part 28, and the step S7 corresponds to the operation of the word specifying part 29.

Therefore, this embodiment can recognize the input words with a high recognition rate when compared to the conventional speech recognition apparatus, because this embodiment carries out the word recognition process by putting weight on whether or not the subwords having the high importance match.

In the embodiment described above, the subword with the accent is regarded as being important and the subword with no accent is regarded as not being important. However, the importance of the subword may be defined according to other factors or standards. For example, the subword which is unlikely to become unvoiced when pronounced may be regarded as being important, and the subword which is likely to become unvoiced when pronounced such as a vowel sandwiched between two unvoiced consonants or consonant sounds may be regarded as not being important.

In addition, although the embodiment described above calculates the distances using the DP technique, it is of course possible to use other techniques for calculating the distances.

Moreover, although the embodiment described above only uses two levels of importance, that is, important or non-important, it is of course possible to use three or more levels of importance to describe each subword. For example, a first level of importance may be given to a subword having a first accent, a second level of importance may be given to a subword having a second accent, and a third level of importance may be given to a subword having an accent other than the first and second accents. In this case, the first accent may be the strongest accent and the second accent may be the second strongest accent, for example.

Further, the present invention is not limited to these embodiments, but various variations and modifications may be made without departing from the scope of the present invention.

What is claimed is:

1. A speech recognition apparatus comprising:
    a word dictionary storing and managing subword sequences of words and information indicating an importance of each subword in each word, said importance indicating whether or not each subword of each word is an important factor when recognizing each word, said importance being independent for each of the words;
    managing means for managing standard values of acoustic feature patterns of each subword;
    generating means, coupled to said word dictionary and said managing means, for successively reading the subword sequences of the words stored in said word dictionary and for generating acoustic feature patterns of each word using the standard values managed by said managing means; and
    collating means coupled to said word dictionary and said generating means, for calculating and evaluating distances between an acoustic feature pattern of an input word that is to be recognized and each of the acoustic feature patterns generated by said generating means by referring to said information.

2. The speech recognition apparatus as claimed in claim 1, wherein said word dictionary stores said information indicating the importance of each subword in two or more levels of importance.

3. The speech recognition apparatus as claimed in claim 2, wherein said collating means comprises correction means for correcting said distances based on said levels of importance so that the corrected distances become larger for more important subwords.

4. The speech recognition apparatus as claimed in claim 2, wherein a first level of importance indicates a subword with an accent as being important, and a second level of importance indicates a subword with no accent as not being important.

5. The speech recognition apparatus as claimed in claim 2, wherein a first level of importance indicates a subword with a strongest accent as being most important, a second level of importance indicates a subword with a second strongest accent as being second important, and a third level of importance indicates a subword as being less important than the first and second levels of importance.

6. The speech recognition apparatus as claimed in claim 2, wherein a first level of importance indicates a subword that is unlikely to become unvoiced when pronounced as being important, and a second level of importance indicates a subword that is likely to become unvoiced when pronounced as not being important.

7. The speech recognition apparatus as claimed in claim 2, which further comprises:
    output means, coupled to said collating means, for outputting a word having a smallest sum total of distances of the acoustic feature patterns of the subwords from the acoustic feature pattern of the input word as a recognition result of the input word.

8. The speech recognition apparatus as claimed in claim 1, which further comprises:
    output means, coupled to said collating means, for outputting a word having a smallest sum total of distances of the acoustic feature patterns of the subwords from the acoustic feature pattern of the input word as a recognition result of the input word.

9. The speech recognition apparatus as claimed in claim 1, wherein each of said subwords is formed by a syllable.

10. The speech recognition apparatus as claimed in claim 1, wherein each of said subwords is formed by one or a plurality of phonetic symbols.

11. A word dictionary adapted for use on a speech apparatus which recognizes an input word by collating an acoustic feature pattern of the input word with acoustic feature patterns of words stored in a word dictionary, said word dictionary comprising:
    a recording medium;
    subword sequences of words stored in said recording medium; and
    information indicating an importance of each subword in each of the subword sequences which form the words, said information being stored in said recording medium together with said subword sequences,
    said importance indicating whether or not each subword of each word is an important factor when recognizing the input word on the speech recognition apparatus, and
    said importance being independent for each word.

12. The word dictionary as claimed in claim 11, wherein said information indicating the importance of the subwords is stored in said recording medium in two or more levels of importance.

13. The word dictionary as claimed in claim 12, wherein a first level of importance indicates a subword with an accent as being important, and a second level of importance indicates a subword with no accent as not being important.

14. The word dictionary as claimed in claim 12, wherein a first level of importance indicates a subword with a strongest accent as being most important, a second level of importance indicates a subword with a second strongest accent as being second important, and a third level of importance indicates a subword as being less important than the first and second levels of importance.

15. The word dictionary as claimed in claim 12, wherein a first level of importance indicates a subword that is unlikely to become unvoiced when pronounced as being important, and a second level of importance indicates a subword that is likely to become unvoiced when pronounced as not being important.

16. The word dictionary as claimed in claim 11, wherein each of said subwords is formed by a syllable.

17. The word dictionary as claimed in claim 11, wherein each of said subwords is formed by one or a plurality of phonetic symbols.

18. A speech recognition apparatus comprising:

a word dictionary storing and managing subword sequences of words, and information indicating an importance of each subword in each subword sequence, the importance indicating whether the subwords of each word are an important factor for word recognition, and the importance including at least an accent of each subword;

managing means for managing standard values of acoustic feature patterns of each subword;

generating means, coupled to said word dictionary and said managing means, for successively reading the subword sequences stored in said word dictionary and for generating acoustic feature patterns of each word using the standard values managed by said managing means; and collating means coupled to said word dictionary and said generating means, for calculating and evaluating distances between an acoustic feature pattern of an input word that is to be recognized and each of the acoustic feature patterns generated by said generating means by referring to said information.

19. A word dictionary adapted for use on a speech recognition apparatus which recognizes an input word by collating an acoustic feature pattern of the input word with acoustic feature patterns of words stored in the word dictionary, said word dictionary comprising:

a recording medium;

subword sequences of words stored in said recording medium; and information indicating an importance of each subword in each subword sequence stored in said recording medium together with said subword sequences, said importance indicating whether each subword of each word is an important factor for word recognition with the speech recognition apparatus, and said importance including at least an accent of each subword.

* * * * *

UNITED STATES PATENT AND TRADEMARK OFFICE
CERTIFICATE OF CORRECTION

PATENT NO. : 5,704,005
DATED : Dec. 30, 1997
INVENTOR(S) : IWAMIDA

It is certified that error appears in the above-identified patent and that said Letters Patent is hereby corrected as shown below:

TITLE PAGE: [56] References Cited, FOREIGN PATENT DOCUMENTS, add the following:

4-204899   7/1992   Japan .

Col. 4, line 67, after ""CHI"" insert --,--.

Col. 5, line 50, after "part" insert --25.--.

Col. 6, line 40, change "a" to --a--.

Signed and Sealed this

Thirtieth Day of June, 1998

Attest:

BRUCE LEHMAN

Attesting Officer     Commissioner of Patents and Trademarks